United States Patent
Kamo (10) Patent No.: US 9,671,675 B2
(45) Date of Patent: Jun. 6, 2017

(54) STOP APPARATUS, AND LENS APPARATUS AND IMAGE PICKUP APPARATUS HAVING THE SAME

(71) Applicant: CANON KABUSHIKI KAISHA, Tokyo (JP)

(72) Inventor: Daichi Kamo, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/001,287

(22) Filed: Jan. 20, 2016

(65) Prior Publication Data
US 2016/0209725 A1 Jul. 21, 2016

(30) Foreign Application Priority Data
Jan. 20, 2015 (JP) ................................. 2015-008247

(51) Int. Cl.
*G03B 9/06* (2006.01)

(52) U.S. Cl.
CPC ...................... *G03B 9/06* (2013.01)

(58) Field of Classification Search
USPC ........................................................ 396/510
See application file for complete search history.

(56) References Cited

U.S. PATENT DOCUMENTS

| | | | |
|---|---|---|---|
| 6,269,226 B1 * | 7/2001 | Aoshima ................... | G03B 9/10 396/458 |
| 7,778,538 B2 * | 8/2010 | Takeda ..................... | G02B 7/10 396/64 |
| 2006/0002702 A1 * | 1/2006 | Masuda .................... | G03B 9/06 396/510 |
| 2009/0269048 A1 * | 10/2009 | Suzuki ..................... | G03B 9/06 396/510 |
| 2012/0076486 A1 * | 3/2012 | Bai .......................... | G03B 9/06 396/463 |

FOREIGN PATENT DOCUMENTS

| | | |
|---|---|---|
| JP | 03182709 A | 8/1991 |
| JP | 2004294678 A | 10/2004 |
| JP | 2012123299 A | 6/2012 |

* cited by examiner

*Primary Examiner* — Clayton E Laballe
*Assistant Examiner* — Linda B Smith
(74) *Attorney, Agent, or Firm* — Rossi, Kimms & McDowell LLP (57) ABSTRACT

A stop apparatus includes blades each having a drive pin, a support member supporting pivot members of the blades, and a cam member having cams engaging with the drive pins. The blades form an aperture. The cam member includes cams of which the largest radial distances from the center of the aperture are different from each other. The blades include first blades and second blades. The radial distance from the center of the drive pins of the first blades and that of the drive pins of the second blades are different from each other in an open aperture state. The pivot members of the first and second blades are disposed at positions at a radial distance from the center shorter than the radial distance from the center of a drive pin having the longest radial distance from the center in the open aperture state among the drive pins.

18 Claims, 12 Drawing Sheets

STOP APPARATUS, AND LENS APPARATUS AND IMAGE PICKUP APPARATUS HAVING THE SAME

BACKGROUND OF THE INVENTION

Field of the Invention

The present invention relates to a stop apparatus used in a lens apparatus for image taking, in particular to a stop apparatus having an aperture diameter varied by rotational operation. The present invention also relates to a lens apparatus and an image pickup apparatus having such a stop apparatus.

Description of the Related Art

There has been known a stop apparatus including a plurality of stop blades each having a pivot axis arranged concyclically at regular angular intervals and having a stop aperture defined by edges of the overlapping stop blades, which is varied by rotations of the stop blades about their respective pivot axes. This type of stop apparatus includes a pivot pin and a drive pin provided for each of the stop blades, and the position of the drive pin relative to the pivot pin planted at a fixed position is guided by a cam groove provided in a disk-like cam plate.

For example, Japanese Patent Application Laid-Open No. 2004-294678 discloses a stop apparatus having six stop blades. In this apparatus, pivot pins for the six stop blades are fitted to engage holes provided on a stop support member, and the stop aperture is varied by rotating a cam plate having six cam grooves engaging with the drive pins of the respective stop blades. When this stop apparatus is built in a lens apparatus, the rotary operating member and the cam plate are linked to allow manual control of the light quantity.

The shape of the stop aperture affects the quality of bokeh (the aesthetic quality of blur) around the main subject of picked up images, and the closer to a circle the shape of the stop aperture is, the more excellent the bokeh is rendered. A widely known method of making the stop aperture shape close to a circle is to increase the number of the stop blades. Japanese Patent Application Laid-Open No. 2012-123299 discloses a stop apparatus having an aperture shape close to a circle formed by fourteen stop blades.

For the above reason, the stop apparatus is required to have a stop aperture shape close to a circle. Moreover, the stop apparatus is required to have a large rotational operation angle in order to allow fine adjustment of the light quantity by manual operation. In particular, when applied to a lens apparatus such as a cinema lens that is required to form beautiful images and to allow fine light quantity adjustment, the stop apparatus is required to meet both the requirements.

A widely known method of enlarging the rotational operation angle is to provide a differential mechanism including a roller operating between a rotary member in the lens apparatus and the manual operation member to enlarge the rotation angle of the manual operation member relative to the rotation angle of the rotary member in the lens apparatus, as disclosed in Japanese Patent Application Laid-Open No H03-182709.

However, it is difficult in the prior art apparatuses disclosed in Japanese Patent Application Laid-Open Nos. 2004-294678 and 2012-123299 mentioned above to achieve a large rotational operation angle while using a large number of stop blades because of a restrictive condition that interference of cam grooves that guide the drive pins of the stop blades with each other must be prevented. Therefore, conventional stop apparatuses that use a large number of blades in order to achieve a stop aperture shape close to a circle do not allow fine adjustment of the light quantity using an operation member, causing inconvenience in image shooting.

Applying the structure disclosed in Japanese Patent Application Laid-Open No. H03-182709 mentioned above leads to a problem of increase in the overall size of the stop apparatus including the differential mechanism.

SUMMARY OF THE INVENTION

An object of the present invention is to provide a small-size stop apparatus that allows fine light quantity adjustment with a large rotational operation angle while having a stop aperture shape close to a circle formed by a large number of stop blades.

To achieve the above object, a stop apparatus according to the present invention comprises a plurality of stop blades each having a drive pin, a support member supporting pivot members of the stop blades, and a cam member having cams engaging with the drive pins, the plurality of stop blades forming an aperture, wherein the cam member has a plurality of cams of which the largest radial distances from the center of the aperture are different from each other, the plurality of stop blades include first stop blades and second stop blades, the radial distance of the drive pins of the first stop blades from the center of the aperture and the radial distance of the drive pins of the second stop blades from the center of the aperture are different from each other in an open aperture state, and the pivot members of the first stop blades and the second stop blades are disposed at positions at a radial distance from the center of the aperture shorter than the radial distance from the center of the aperture of a drive pin having the longest radial distance from the center of the aperture in the open aperture state among the plurality of drive pins.

The present invention can provide a small size stop apparatus that enables fine adjustment of light quantity with a large rotational operation angle without an increase in the number of parts.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

In the following, preferred modes of the present invention will be described based on embodiments shown in FIGS. 1 to 14.

[First Embodiment]

Figure 1:
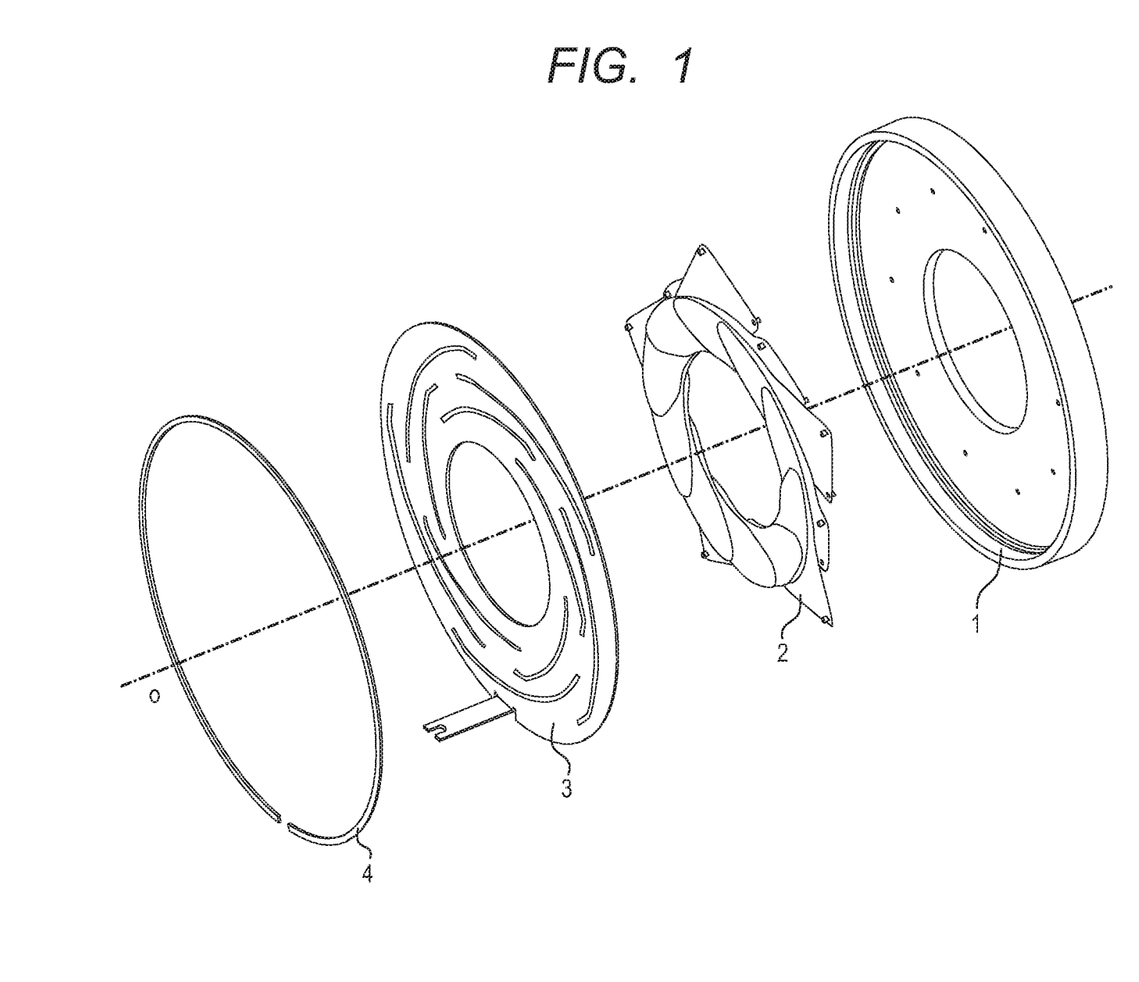
FIG. 1 is an exploded perspective view of a stop mechanism according to a first embodiment of the present invention.

FIG. 1 is an exploded perspective view of an embodiment of the stop apparatus. As shown in FIG. 1, the stop apparatus is composed of a stop blade support barrel (support member) 1, a plurality of stop blades 2, a cam plate (cam member) 3, and a press washer 4.

Figure 2:
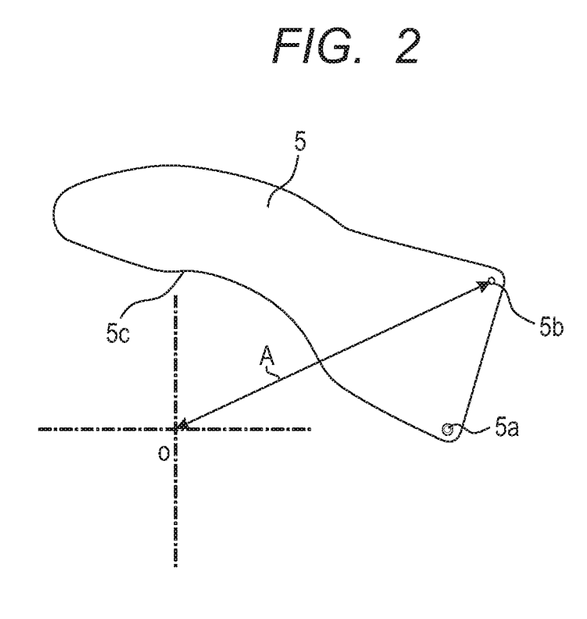
FIG. 2 is a diagram showing a first stop blade in the first embodiment of the present invention seen from its side on which a drive pin is provided.
Figure 3:
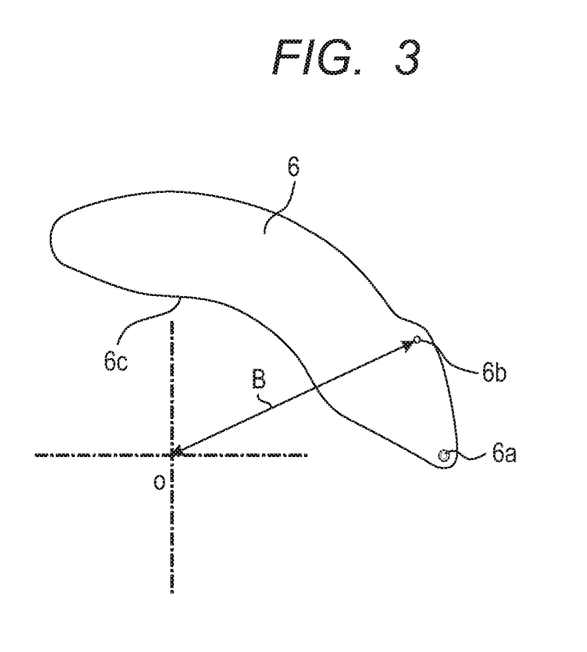
FIG. 3 is a diagram showing a second stop blade in the first embodiment of the present invention seen from its side on which a drive pin is provided.

The stop blades 2 include two types of stop blades, namely first stop blades 5 shown in FIG. 2 and second stop blades 6 shown in FIG. 3.

Figure 4:
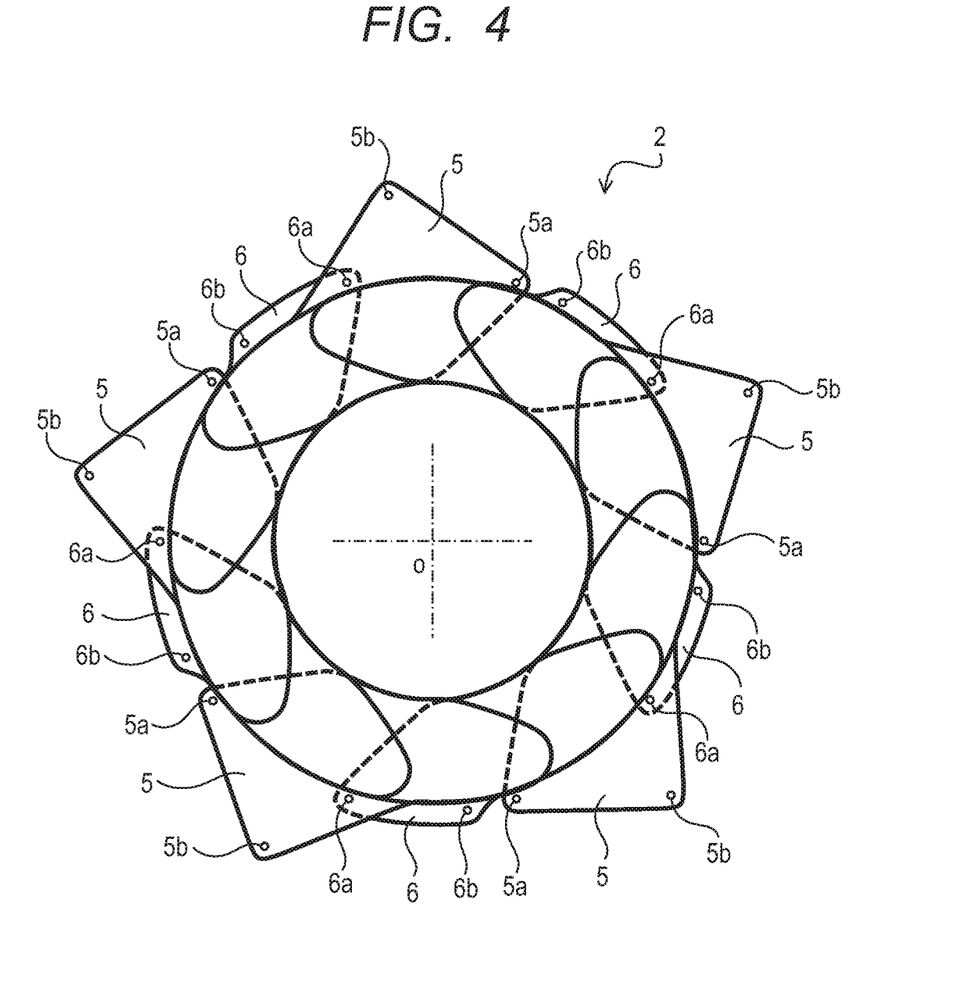
FIG. 4 is a diagram showing an arrangement of the first stop blades and the second stop blades in the first embodiment of the present invention.
Figure 5:
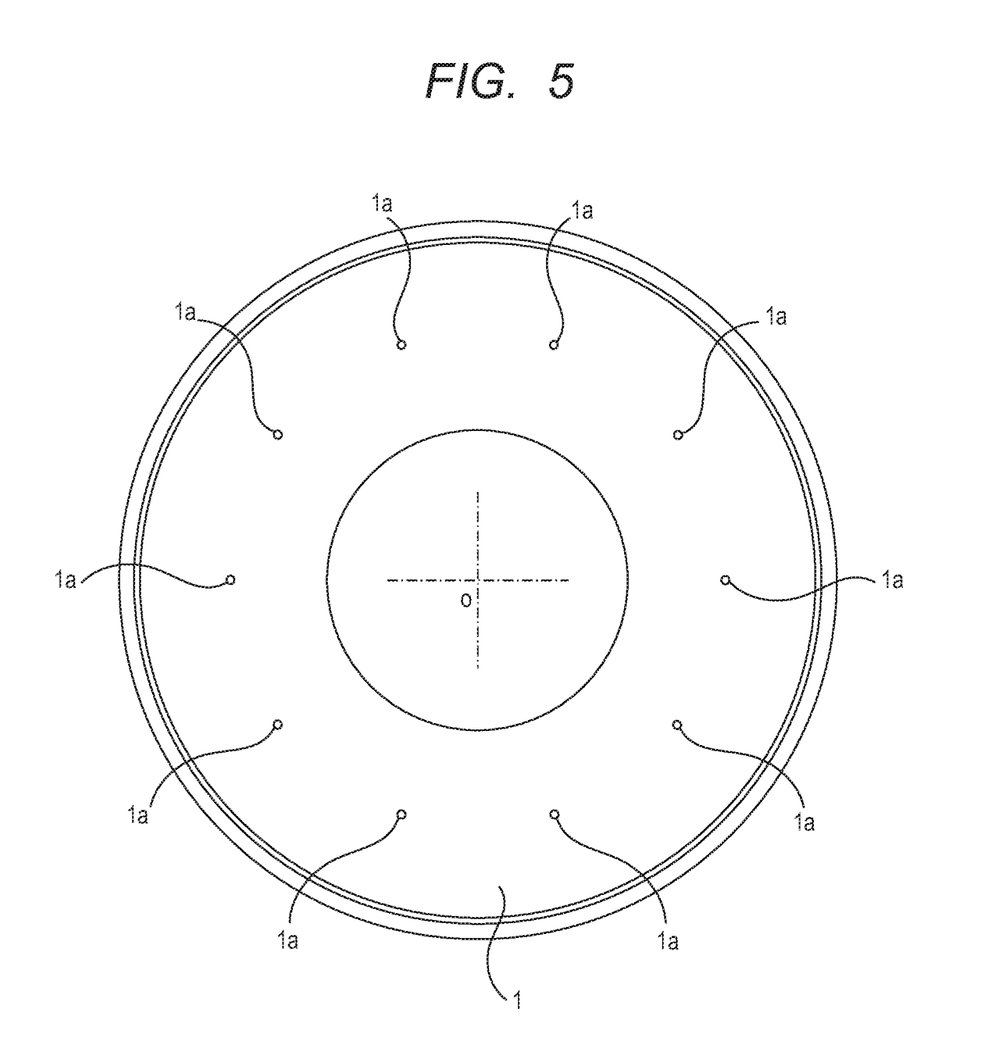
FIG. 5 is a diagram showing a stop blade support barrel (support member) in the first embodiment of the present invention.

Each of both the first and second stop blades 5, 6 is provided with a pivot pin 5a, 6a (pivot member) projecting from one side thereof and a drive pin 5b, 6b projecting from the other side, as shown in FIGS. 2 and 3. As shown in FIGS. 2 to 4, the distance of the drive pins 5b of the first stop blades 5 from the optical axis position o is longer than the distance of the drive pins 6b of the second stop blades 6 from the optical axis position o, and the plate area of the first stop blades 5 is larger than the plate area of the second stop blades 6 accordingly. As shown in FIG. 4, the distance of the pivot pins 5a, 6a of the stop blades from the optical axis o is substantially equal to the distance of the drive pins 6b of the second stop blades 6, which is shorter than the distance of the drive pin 5b of the first stop blades 5 from the optical axis o, in the state in which the stop aperture is fully open (in the open aperture state). Here, the optical axis refers to the optical axis of a lens apparatus in which the stop apparatus according to the present invention is fixedly assembled. When the stop apparatus is assembled in a lens apparatus, the stop apparatus is arranged in such a way that the center of the aperture defined by the stop blades coincides with the optical axis of the lens apparatus. Therefore, in this specification, the term "optical axis position" will be used in the same sense as the position of the center of the aperture formed by the plurality of stop blades and the position of the center of the cam plate.

The stop blades 2 in this embodiment includes five first stop blades 5 and five second stop blades 6, which are arranged alternately in an overlapping manner as shown in FIG. 4, with their pivot pins 5a, 6a engaging in engage holes 1a provided on the stop blade support barrel 1. The pivot axes of the stop blades are fixed by this engagement. In this embodiment, the pivot pins provided on and projecting from the stop blades 2 engage with the engage holes 1a provided on the stop blade support barrel 1. However the present invention is not limited by this arrangement, but the advantageous effects of the present invention can also be enjoyed in the case where pivot pins are provided on the stop blade support barrel 1 and adapted to engage with pivot axis holes provided on the stop blades.

Figure 6:
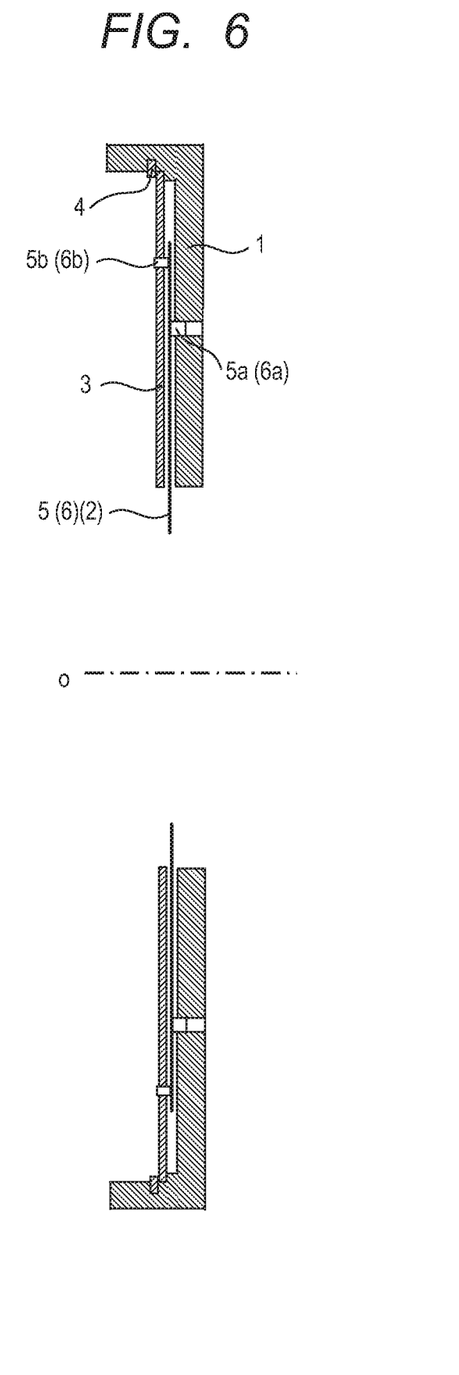
FIG. 6 is a longitudinal cross sectional view of the stop mechanism according to the first embodiment of the present invention.

The cam plate 3 is arranged adjacent to the stop blades 2 on their side provided with drive pins 5b, 6b. The cam plate 3 is adapted to be capable of turning about the optical axis position o relative to the stop blade support barrel 1. As shown in FIG. 6, the stop blades 2 are held between the cam plate 3 and the stop blade support barrel 1.

Figure 7:
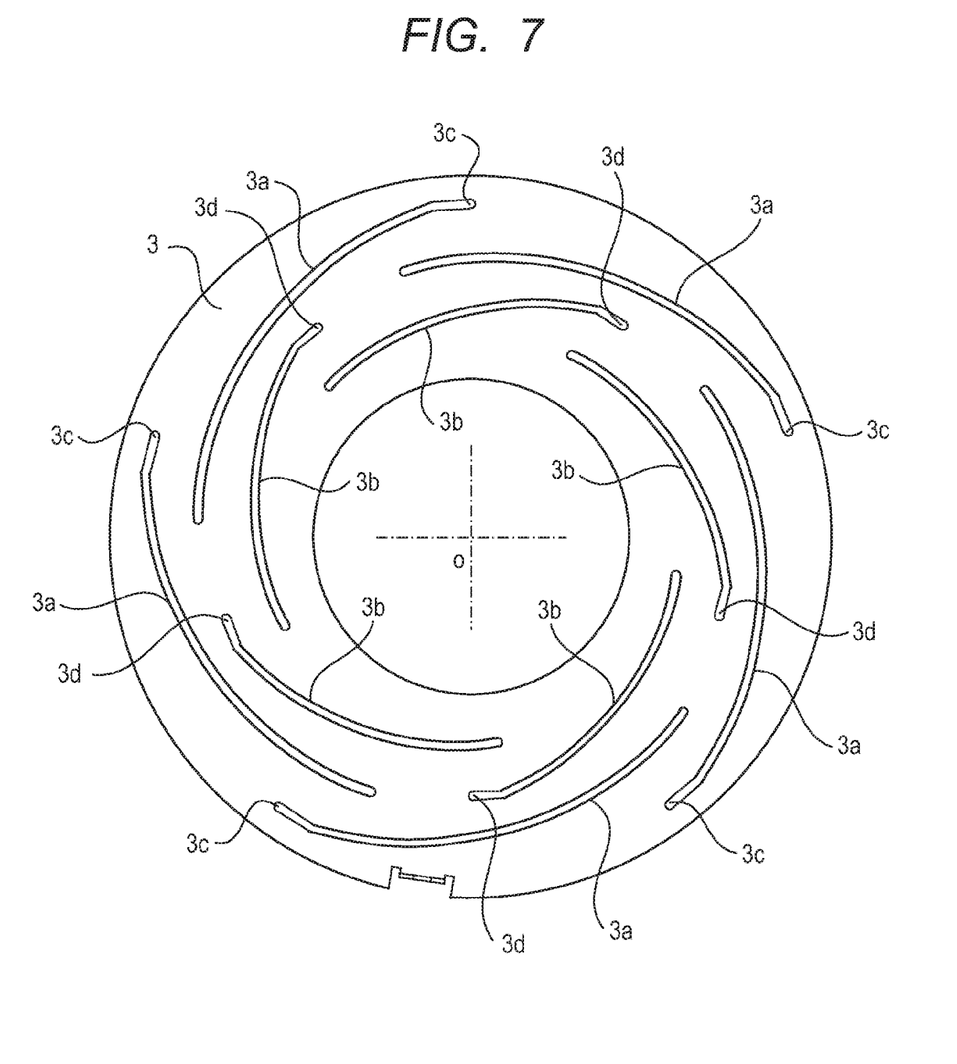
FIG. 7 is a diagram showing a cam plate in the first embodiment of the present invention.

As shown in FIG. 7, the cam plate 3 has five first cam grooves 3a and five second cam grooves 3b. The distance of the positions 3c from which the first cam grooves 3a start to extend (the positions at which the drive pins 5b are situated in the open aperture state) from the optical axis position o is different from the distance of the positions 3d from which the second cam grooves 3b start to extend (the positions at which the drive pins 6b are situated in the open aperture state) from the optical axis position o. The drive pins 5b of the first stop blades 5 engage with the first cam grooves 3a, and the drive pins 6b of the second stop blades 6 engage with the second cam grooves 3b.

With the above-described structure, as the cam plate 3 is turned about the optical axis position o relative to the stop blade support member 1, the drive pins 5b of the first stop blades 5 and the drive pins 6b of the second stop blades 6 are respectively guided along the first cam grooves 3a and the second cam grooves 3b. Consequently, the first stop blades 5 are swung about the pivot pins 5a, and the second stop blades 6 are swung about the pivot pins 6a. The first cam grooves 3a and the second cam grooves 3b are shaped in such a way that the F-number of the lens apparatus is changed by one step with the change in the aperture shape caused by inclination (swinging) of the stop blades as an operation ring is turned by every certain constant rotational operation angle.

As above, arranging the positions 3c and 3d from which the cam grooves start to extend at different distances from the optical axis position o allows the cam grooves, which are arranged concyclically in prior art apparatuses, to be arranged alternately at different radial positions, thereby providing an additional room with respect to the circumferential direction. Thus, the cam grooves can be made longer than the cam grooves in prior art apparatuses, and therefore, the rotational operation angle can be increased.

This effect is advantageous in lenses for broadcast apparatuses in which the stop mechanism is operated manually. If the present invention is applied to the prior art stop mechanism disclosed in Japanese Patent Application Laid-Open No. 2004-294678, operability in terms of the rotation angle similar to the apparatus using six stop blades can be achieved in a stop mechanism using seven or more stop blades.

The positional relationship between the pivot pins 5a, 6a and the inner edges 5c, 6c is the same between the first stop blades 5 and the second stop blades 6. Therefore, if the blades are inclined (swung) by the same angle, the aperture shape is always defined by all the blades. Therefore, an aperture shape close to a circle can be achieved. Moreover, the pivot pins 5a, 6a of both the first and second stop blades 5, 6 are located at positions at the same or substantially the same radial distance from the optical axis position o as the positions of the drive pins 6b of the second stop blades 6, which are closer to the optical axis position o than the drive pins 5b of the first stop blades 5. Therefore, the size of the second stop blades 6 can be made small, and the area of the stop blades can be made small. Thus, it is possible to reduce the sliding contact areas between the stop blades, the cam plate, and the blades support barrel, thereby enabling a reduction of frictional resistance.

[Second Embodiment]

A stop mechanism according to the second embodiment differs from the first embodiment in the following respects. The second embodiment is characterized in that the end point of at least one of the cam grooves arranged at outer positions in the cam plate is located at a shorter distance from the optical axis position o (namely, closer to the optical axis position) than the start point of the cam grooves arranged at inner positions in the cam plate. Moreover, the second embodiment is also characterized in that the shapes of the stop blade plates are the same. Moreover, the second embodiment is also characterized in that two adjacent cam grooves that have start points equidistant from the optical axis o have different shapes.

Figure 8:
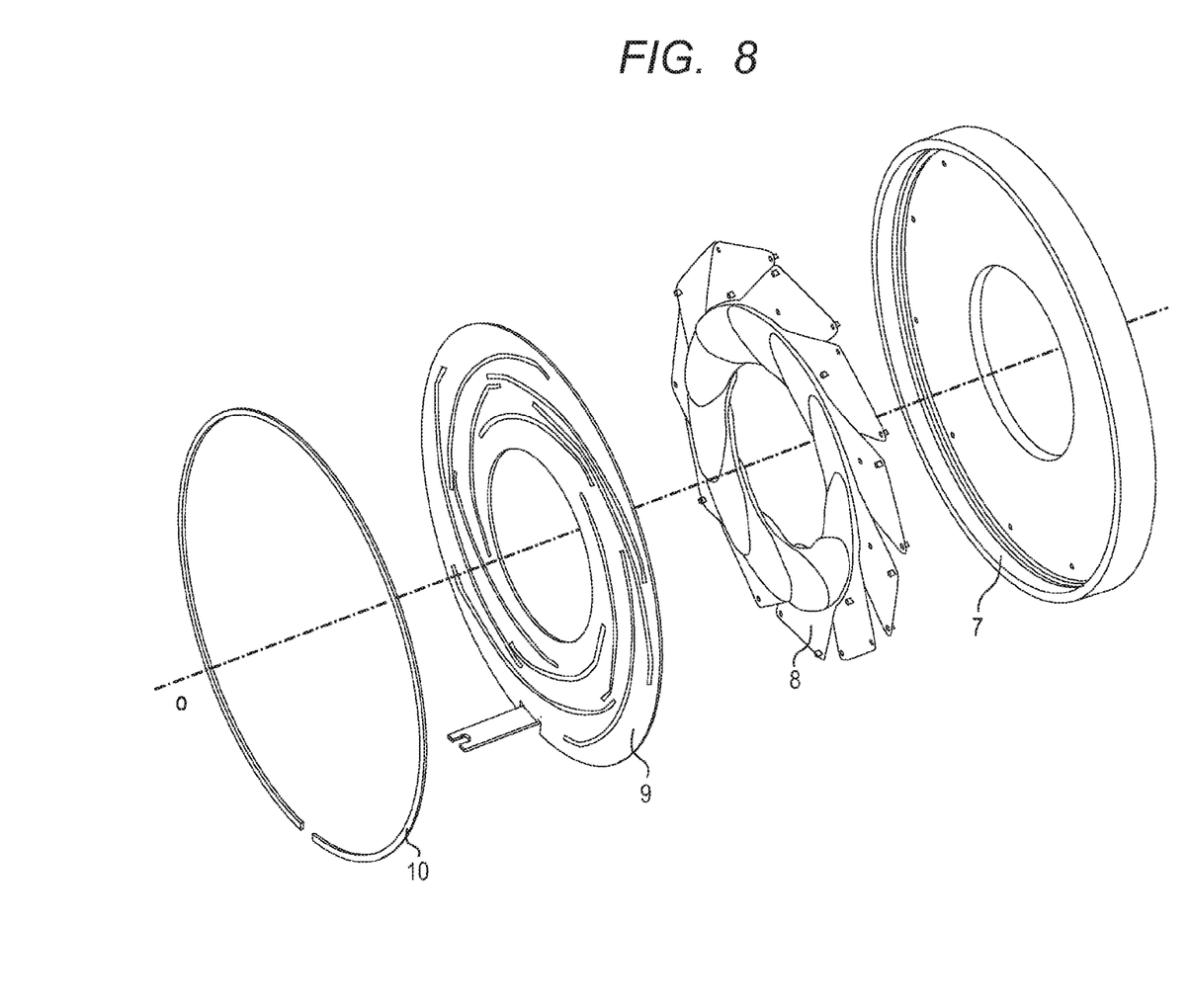
FIG. 8 is an exploded perspective view of a stop mechanism according to a second embodiment of the present invention.

FIG. 8 is an exploded view of a stop apparatus of this embodiment. As shown in FIG. 8, the stop apparatus is composed of a stop blade support barrel (support member) 7, a plurality of stop blades 8, a cam plate 9, and a press washer 10.

Figure 9:
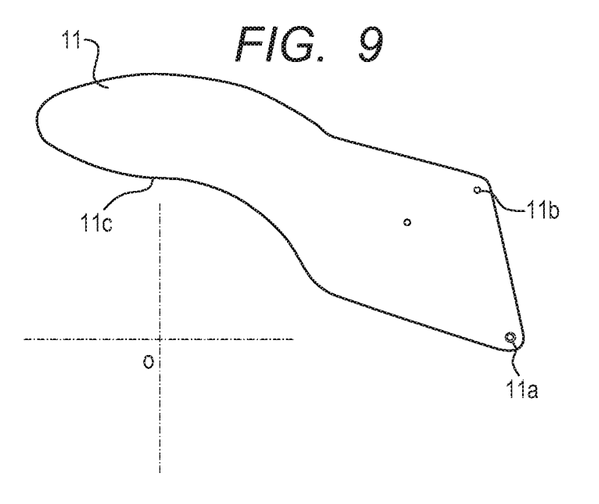
FIG. 9 is a diagram showing a first stop blade in the second embodiment of the present invention seen from its side on which a drive pin is provided.
Figure 10:
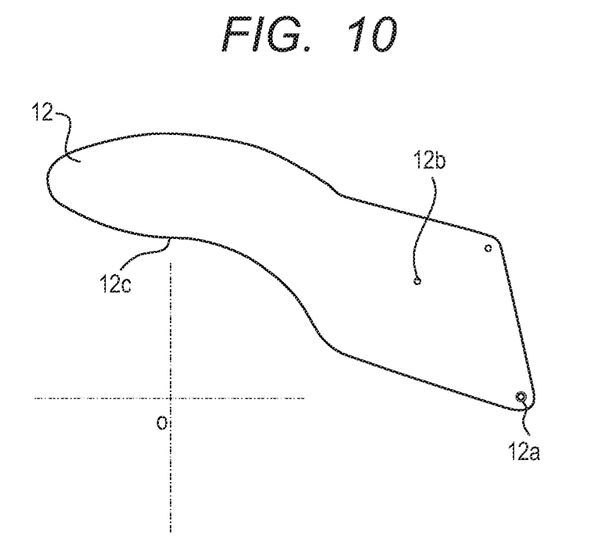
FIG. 10 is a diagram showing a second stop blade in the second embodiment of the present invention seen from its side on which a drive pin is provided.

The stop blades 8 include two types of stop blades, namely first stop blades 11 shown in FIG. 9 and second stop blades 12 shown in FIG. 10.

Figure 11:
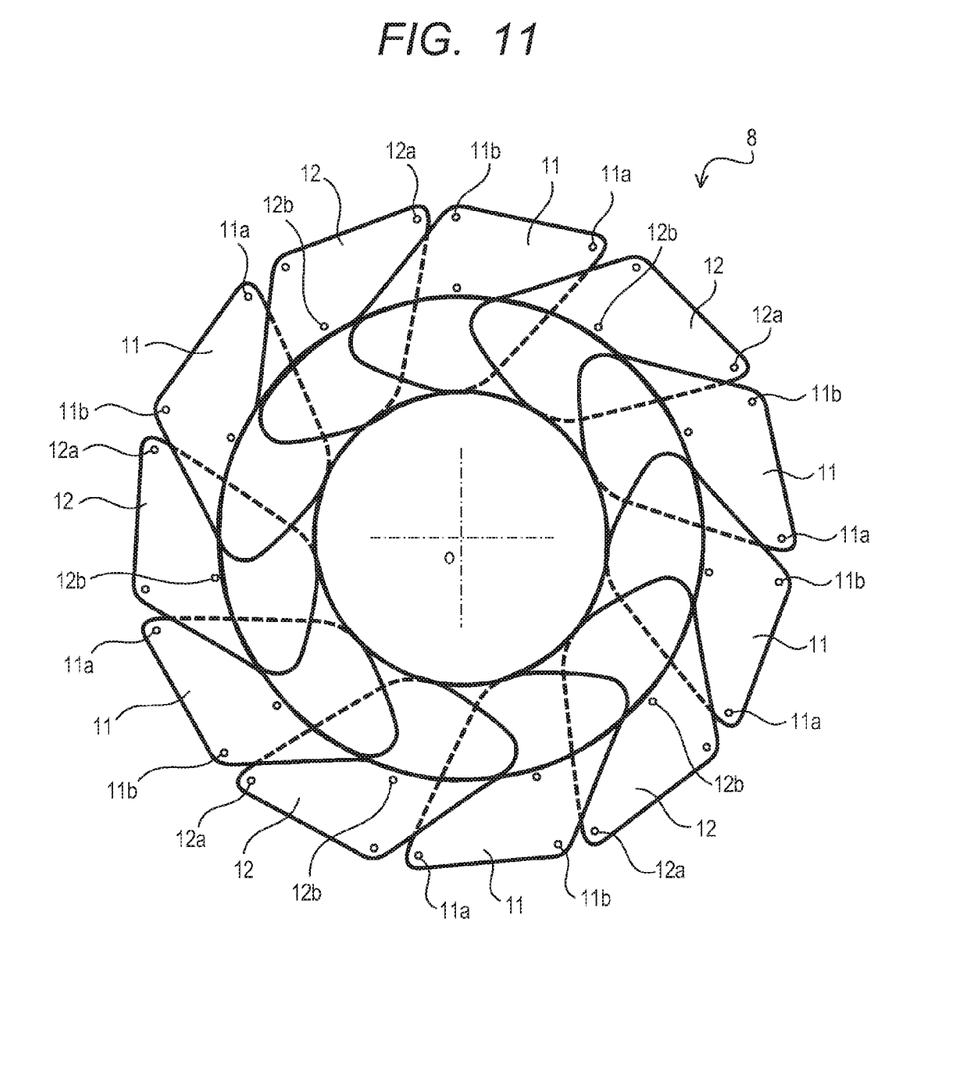
FIG. 11 is a diagram showing an arrangement of the first stop blades and the second stop blades in the second embodiment of the present invention.

Each of both the first and second stop blades 11, 12 is provided with a pivot pin 11a, 12a projecting from one side thereof and a drive pin 11b, 12b projecting from the other side, as shown in FIGS. 9 and 10. As shown in FIGS. 9 and 10, the plate part of the first stop blade 11 and the plate part of the second stop blade 12 have the same shape. The first stop blade 11 and the second stop blade 12 differ from each other in the distance of the swaging position of the drive pin 11b, 12b from the optical axis position o. As shown in FIG. 11, the pivot pins 11a, 12a of both the first stop blades 11 and the second stop blades 12 are provided at positions at equal distance from the optical axis position o in the state in which the stop aperture is fully open (in the open aperture state).

Figure 12:
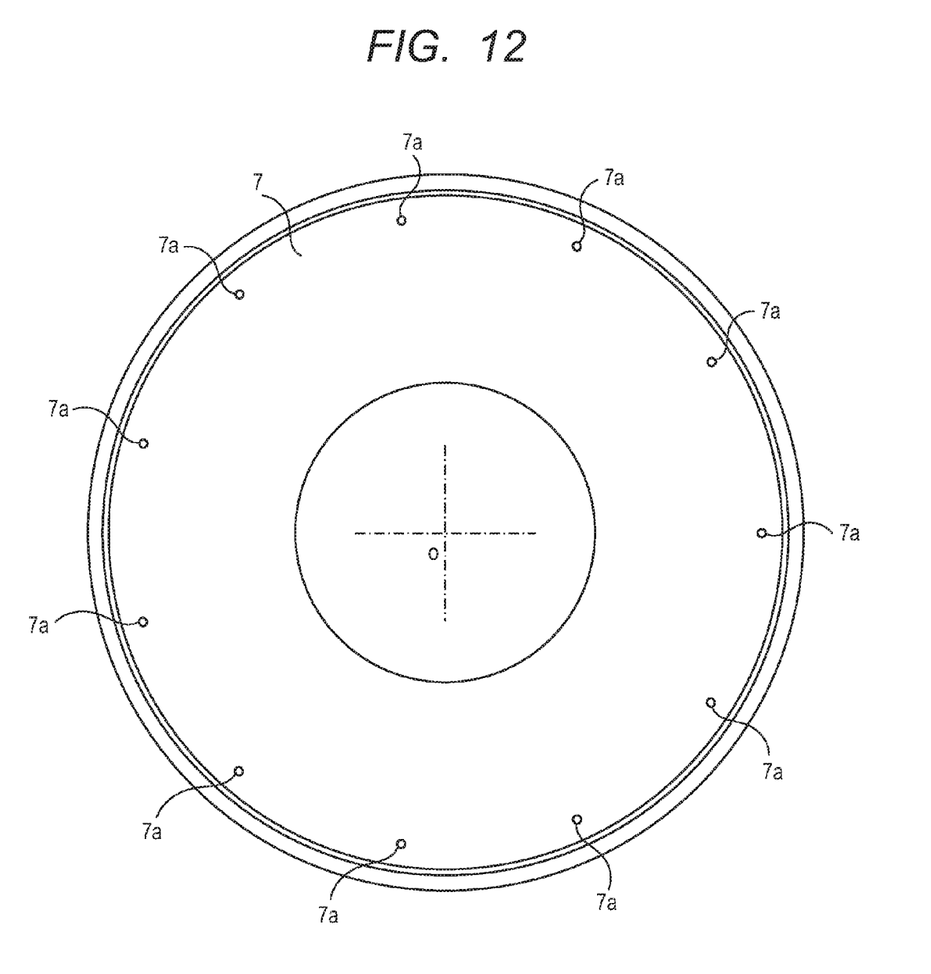
FIG. 12 is a diagram showing a stop blade support barrel (support member) in the second embodiment of the present invention.

The stop blades 8 in this embodiment includes six first stop blades 11 and five second stop blades 12, which are arranged alternately in an overlapping manner as shown in FIG. 11, with their pivot pins 11a, 12a engaging in engage holes 7a provided on the stop blade support barrel 7 shown in FIG. 12. In this embodiment, the pivot pins provided on and projecting from the stop blades 8 engage with the engage holes 7a provided on the stop blade support barrel 7. However the present invention is not limited by this arrangement, but the advantageous effects of the present invention can also be enjoyed in the case where pivot pins are provided on the stop blade support barrel 7 and adapted to engage with pivot axis holes provided on the stop blades.

Figure 13:
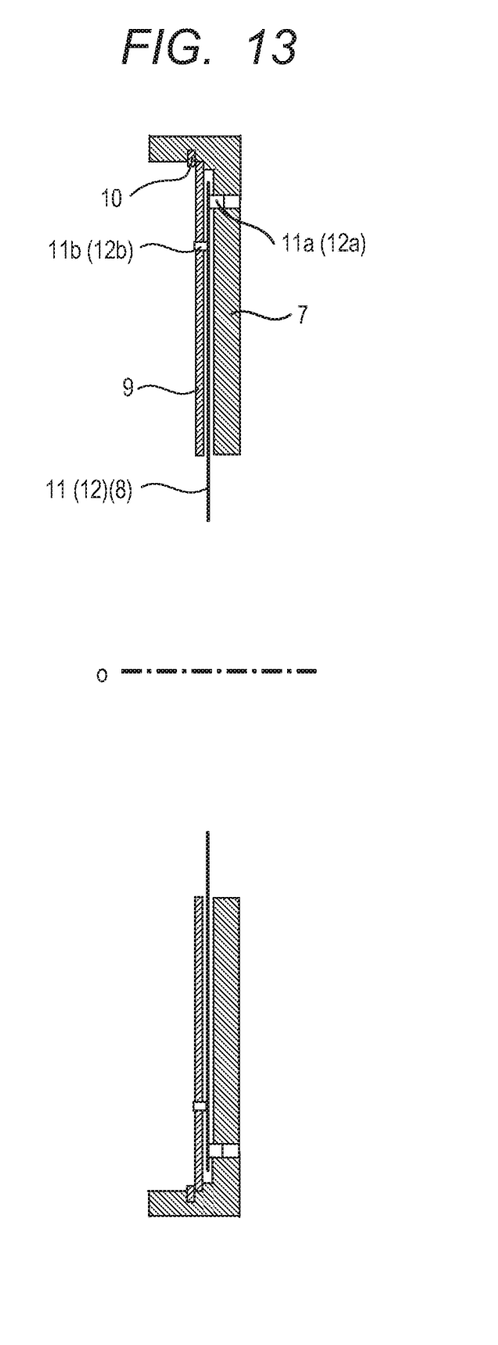
FIG. 13 is a longitudinal cross sectional view of the stop mechanism according to the second embodiment of the present invention.

The cam plate 9 is arranged adjacent to the stop blades 8 on their side provided with drive pins 11b, 12b. The cam plate 9 is adapted to be capable of turning about the optical axis position o relative to the stop blade support barrel 7. As shown in FIG. 13, the stop blades 8 are held between the cam plate 9 and the stop blade support barrel 7.

Figure 14:
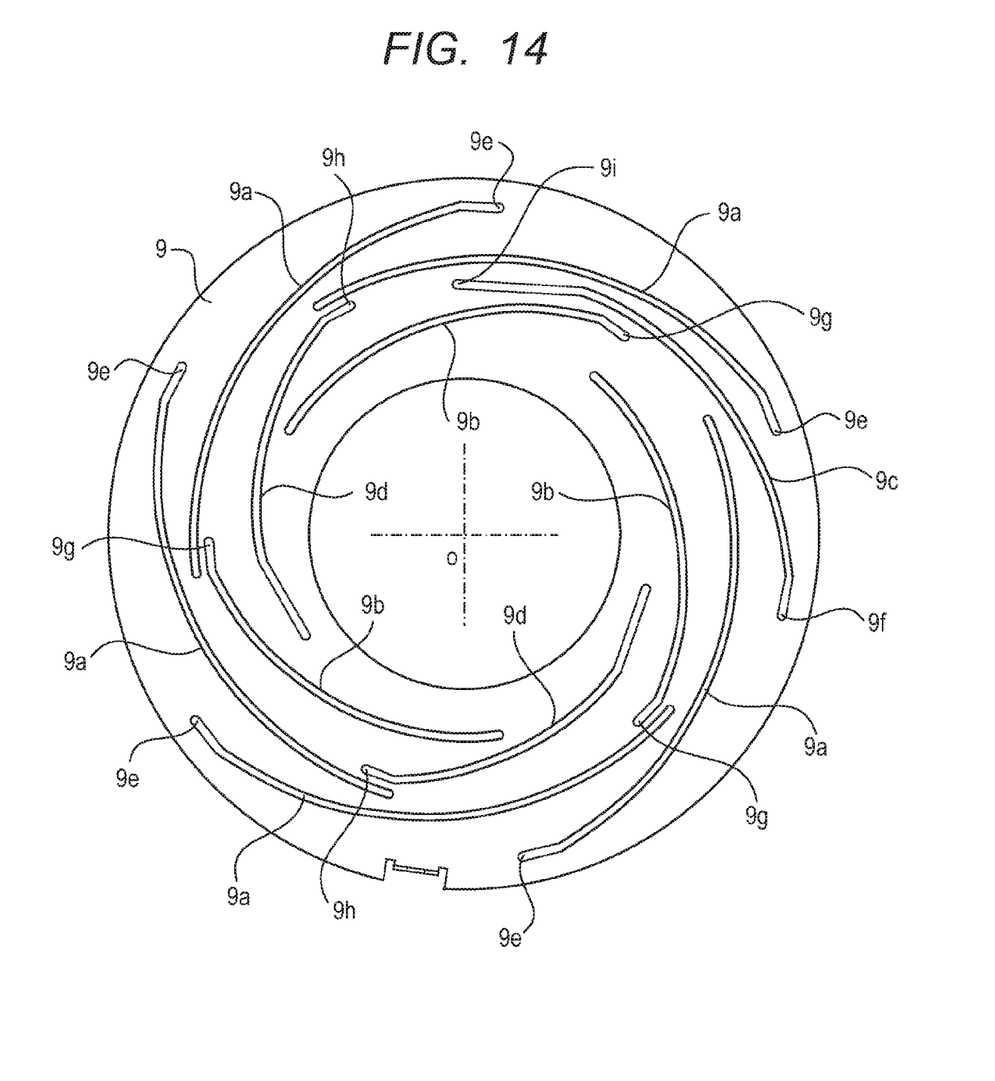
FIG. 14 is a diagram showing a cam plate in the second embodiment of the present invention.

As shown in FIG. 14, the cam plate 9 has five first cam grooves 9a, three second cam grooves 9b, one third cam groove 9c, and two fourth cam grooves 9d. The distance of the start positions 9e (in the open aperture state) of the first cam grooves 9a from the optical axis position o and the distance of the start positions 9g of the second cam grooves 9b from the optical axis position o are different from each other. The third cam groove 9c has a shape designed to establish a closed state in which light from the object field is blocked with no aperture area. The distance of the start position 9f of the third cam groove 9c from the optical axis position o is equal to the distance of the start positions 9e of the first cam grooves 9a from the optical axis position o. The fourth cam grooves 9d have a shape designed to establish the closed state. The distance of the start positions 9h of the fourth cam grooves 9d from the optical axis position o is equal to the distance of the start positions 9g of the second cam grooves 9b from the optical axis position o. The drive pins 11b of the first stop blades 11 engage with the first cam grooves 9a or the third cam groove 9c, the drive pins 12b of the second stop blades 12 engage with the second cam grooves 9b or the fourth cam grooves 9d. The distance of the end position 9i of at least one cam groove among the first and third cam grooves 9a, 9c from the optical axis position o is shorter than the distance of the start positions 9g, 9h of the second and fourth cam grooves from the optical axis position o. In other words, the inner end (9i) of at least one cam groove among the cam grooves arranged at outer positions with respect to the radial directions from the center of the aperture formed by the stop blades is located closer to the center of the aperture than the outer end (9g, 9h) of at least one cam groove among the cam grooves arranged at inner positions with respect to the radial directions.

When cam grooves having start positions equidistant from the optical axis position o are arranged adjacent to each other, as is the case with cam grooves 9a and 9c in FIG. 14, the cam groove that has a shape designed to establish the close state is arranged upstream with respect to the direction of rotation of the cam plate for decreasing the apertures. Thus, in the case shown in FIG. 14, the number of the cam grooves is an odd number (eleven), and the cam groove (9c) arranged upstream with respect to the direction of rotation of the cam plate for decreasing the aperture among two adjacent cam grooves (9a, 9c) of which the largest distance positions (largest distances) with respect to radial directions from the center of the aperture formed by the stop blade are equidistant from the center of the aperture has a shape designed to close the aperture in the small aperture range (a portion of the cam groove near position 9i). When the stop mechanism is brought into the close state, only three stop blades, or the two stop blades 12 that engage with the cam grooves 9d and one stop blade 11 that engages with the cam groove 9c are driven in the range near the close state to achieve the closed state.

As above, since the number of the cam grooves provided in the cam plate is an odd number (11), if the first stop blades 11 and the second stop blades 12 between which the radial distance of the drive pin from the optical axis position (the center of the aperture) is different are arranged alternately, two first stop blades 11 or two second stop blades 12 are adjacent at a position. Because this apparatus is intended to achieve a large rotational angle with a compact design, it is preferred that the adjacent stop blades be first stop blades 11, which uses cam grooves that are arranged outer positions with respect to radial direction with respect to the optical axis position. However, even with this arrangement, there is a possibility of interference of cam grooves near the largest aperture (inner positions with respect to the radial direction of the aperture). Therefore, in the present invention, among the two adjacent cam grooves of which the largest distance positions (largest distances) with respect to radial directions from the center of the aperture are equidistant from the center of the aperture, the cam groove arranged upstream with respect to the direction of rotation of the cam plate for decreasing the aperture is shaped in such a way as to be operative when closing the aperture in the small aperture range for decreasing the aperture diameter.

With the above described structure, as the cam plate 9 is turned about the optical axis position o relative to the stop blade support barrel 7, the drive pins 11b of the first stop blades 11 are guided by the first cam grooves 9a or the third cam groove 9c. Moreover, the drive pins 12b of the second stop blades 12 are guided by the second cam grooves 9b or the fourth cam grooves 9d. Consequently, the first stop blades 11 are swung about the pivot pins 11a, and the second stop blades 12 are swung about the pivot pins 12a. The first to fourth cam grooves 9a, 9b, 9c, 9d are shaped in such a way that the F-number of the lens apparatus is changed by one step with the change in the aperture shape caused by inclination of the stop blades as an operation ring is turned by every certain constant rotational operation angle, except for the shape of the portions designed to achieve the close state.

As above, arranging the start positions 9e, 9f, 9g, 9h of the cam grooves 9a, 9c, 9b, 9d at different distances from the optical axis position o allows the cam grooves, which are arranged concyclically in prior art apparatuses, to be arranged alternately at different radial positions, thereby providing an additional room with respect to the circumferential direction. Thus, the cam grooves can be made longer than the cam grooves in prior art apparatuses, and therefore, the rotational operation angle can be increased.

This effect is advantageous in lenses for broadcast apparatuses in which the stop mechanism is operated manually. If the present invention is applied to the prior art stop mechanism disclosed in Japanese Patent Application Laid-Open No. 2004-294678, operability in terms of the rotation angle similar to the apparatus using six stop blades can be achieved in a stop mechanism using seven or more stop blades.

The end position 9i of a cam groove arranged at an outer position is closer to the optical axis position o than the start positions 9g, 9h of the cam grooves arranged at inner positions. Therefore, the radial widths needed to provide the cam grooves overlap, leading to a reduction in the diameter of the cam plate 9.

The positional relationship between the pivot pins 11a, 12a and the inner edges 11c, 12c is the same between the first stop blades 11 and the second stop blades 12. Therefore, if the blades are inclined by the same angle, the aperture shape is always defined by all the blades. Therefore, an aperture shape close to a circle can be achieved.

A plurality of swaging holes for the drive pin may be provided on the blades to allow the position at which the drive pin is fixed by swaging to be selected from them. This allows the first stop blades 11 and the second stop blades 12 to have a common plate shape, enabling cost reduction.

When cam grooves having start positions equidistant from the optical axis position o are arranged adjacent to each other, a cam groove that has a shape designed to establish the close state is arranged upstream with respect to the direction of rotation of the cam plate for decreasing the apertures. Thus, the inflection of the cam groove designed to achieve the close state can be utilized to prevent interference of the cam grooves.

In the first embodiment also, as in the second embodiment, a plurality of swaging holes for the drive pin may be provided on the blades to allow the position at which the drive pin is fixed by swaging to be selected from them. This allows the first stop blades 11 and the second stop blades 12 to have a common plate shape, enabling cost reduction.

In the second embodiment, the first stop blades of which the distance between the drive pin and the optical axis position o is longer and the second stop blades of which the distance between the drive pin and the optical axis position o is shorter described in the first embodiment may be used. This enables a reduction in the size of the second stop blade plates and a reduction in the area of the stop blades. Thus, it is possible to reduce the sliding contact areas between the stop blades, the cam plate, and the blades support barrel, thereby enabling a reduction of frictional resistance.

A lens apparatus provided with the above-described stop apparatus according to the embodiments can enjoy the advantageous effects of the stop apparatus according to the present invention.

An image pickup apparatus including a lens apparatus provided with the above-described stop apparatus according to the embodiments and a camera apparatus coupled with the lens apparatus can enjoy the advantageous effects of the stop apparatus according to the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-008247, filed Jan. 20, 2015, which is hereby incorporated by reference herein in its entirety.

What is claimed is:

1. A stop apparatus comprising:
a plurality of stop blades each having a drive pin;
a support member supporting pivot members of the stop blades; and
a cam member having cams engaging with the drive pins, the plurality of stop blades forming an aperture,
wherein the cam member includes a plurality of cams of which the largest radial distances from the center of the aperture are different from each other,
the plurality of stop blades include first stop blades and second stop blades, the radial distance of the drive pins of the first stop blades from the center of the aperture and the radial distance of the drive pins of the second stop blades from the center of the aperture are different from each other in an open aperture state, and
the pivot members of the first stop blades and the second stop blades are disposed at positions at a radial distance from the center of the aperture shorter than the radial distance from the center of the aperture of a drive pin having the longest radial distance from the center of the aperture in the open aperture state among the plurality of drive pins.

2. A stop apparatus comprising:
a plurality of stop blades each having a drive pin;
a support member supporting pivot members of the stop blades; and
a cam member having cams engaging with the drive pins, the plurality of stop blades forming an aperture,
wherein the cam member includes a plurality of cams of which the largest radial distances from the center of the aperture are different from each other, the radially inner end of at least one of cams arranged at radially outer positions is located closer to the center of the aperture than the radially outer end of at least one of cams arranged at radially inner positions, and the plurality of stop blades include first stop blades and second stop blades, the radial distance of the drive pins of the first stop blades from the center of the aperture and the radial distance of the drive pins of the second stop blades from the center of the aperture are different from each other in an open aperture state.

3. The stop apparatus according to claim 1, wherein among the cams of the cam member, cams having largest radial distances from the center of the aperture different from each other are arranged alternately.

4. The stop apparatus according to claim 1, wherein the number of the cams of the cam member is an odd number, and among two adjacent cams having the same largest radial distance from the center of the aperture, the cam located upstream with respect to the direction of rotation of the cam member for decreasing the aperture has a shape designed to close the aperture in a small aperture range.

5. The stop apparatus according to claim 1, wherein the radial distance of positions at which the drive pins are fixed on the first stop blades from the center of the aperture is shorter than the radial distance of positions at which the drive pins are fixed on the second stop blades from the center of the aperture, and the area of the first stop blades is smaller than the area of the second stop blades.

6. The stop apparatus according to claim 1, wherein a plate part of each of the plurality of stop blades has a plurality of engage holes to allow selection of a position at which the drive pin is fixed.

7. The stop apparatus according to claim 1, wherein the pivot members provided on the stop blades are pins projecting from the stop blades, which engage with holes provided on the support members to constitute pivots of the stop blades.

8. The stop apparatus according to claim 1, wherein the pivot members provided on the stop blades are engage holes provided on the stop blades, which engage with pins provided on the support members to constitute pivots of the stop blades.

9. The stop apparatus according to claim 2, wherein among the cams of the cam member, cams having largest radial distances from the center of the aperture different from each other are arranged alternately.

10. The stop apparatus according to claim 2, wherein the number of the cams of the cam member is an odd number, and among two adjacent cams having the same largest radial distance from the center of the aperture, the cam located upstream with respect to the direction of rotation of the cam member for decreasing the aperture has a shape designed to close the aperture in a small aperture range.

11. The stop apparatus according to claim 2, wherein the radial distance of positions at which the drive pins are fixed on the first stop blades from the center of the aperture is shorter than the radial distance of positions at which the drive pins are fixed on the second stop blades from the center of the aperture, and the area of the first stop blades is smaller than the area of the second stop blades.

12. The stop apparatus according to claim 2, wherein a plate part of each of the plurality of stop blades has a plurality of engage holes to allow selection of a position at which the drive pin is fixed.

13. The stop apparatus according to claim 2, wherein the pivot members provided on the stop blades are pins projecting from the stop blades, which engage with holes provided on the support members to constitute pivots of the stop blades.

14. The stop apparatus according to claim 2, wherein the pivot members provided on the stop blades are engage holes provided on the stop blades, which engage with pins provided on the support members to constitute pivots of the stop blades.

15. A lens apparatus comprising a stop apparatus, the stop apparatus comprising a plurality of stop blades each having a drive pin, a support member supporting pivot members of the stop blades, and a cam member having cams engaging with the drive pins, the plurality of stop blades forming an aperture, wherein the cam member includes a plurality of cams of which the largest radial distances from the center of the aperture are different from each other, the plurality of stop blades include first stop blades and second stop blades, the radial distance of the drive pins of the first stop blades from the center of the aperture and the radial distance of the drive pins of the second stop blades from the center of the aperture are different from each other in an open aperture state, and the pivot members of the first stop blades and the second stop blades are disposed at positions at a radial distance from the center of the aperture shorter than the radial distance from the center of the aperture of a drive pin having the longest radial distance from the center of the aperture in the open aperture state among the plurality of drive pins.

16. An image pickup apparatus comprising:

a lens apparatus comprising a stop apparatus, the stop apparatus comprising a plurality of stop blades each having a drive pin, a support member supporting pivot members of the stop blades, and a cam member having cams engaging with the drive pins, the plurality of stop blades forming an aperture, wherein the cam member includes a plurality of cams of which the largest radial distances from the center of the aperture are different from each other, the plurality of stop blades include first stop blades and second stop blades, the radial distance of the drive pins of the first stop blades from the center of the aperture and the radial distance of the drive pins of the second stop blades from the center of the aperture are different from each other in an open aperture state, and the pivot members of the first stop blades and the second stop blades are disposed at positions at a radial distance from the center of the aperture shorter than the radial distance from the center of the aperture of a drive pin having the longest radial distance from the center of the aperture in the open aperture state among the plurality of drive pins; and a camera apparatus coupled with the lens apparatus.

17. A lens apparatus comprising a stop apparatus, the stop apparatus comprising a plurality of stop blades each having a drive pin, a support member supporting pivot members of the stop blades, and a cam member having cams engaging with the drive pins, the plurality of stop blades forming an aperture, wherein the cam member includes a plurality of cams of which the largest radial distances from the center of the aperture are different from each other, the radially inner end of at least one of cams arranged at radially outer positions is located closer to the center of the aperture than the radially outer end of at least one of cams arranged at radially inner positions, and the plurality of stop blades include first stop blades and second stop blades, the radial distance of the drive pins of the first stop blades from the center of the aperture and the radial distance of the drive pins of the second stop blades from the center of the aperture are different from each other in an open aperture state.

18. An image pickup apparatus comprising:
a lens apparatus comprising a stop apparatus, the stop apparatus comprising a plurality of stop blades each having a drive pin, a support member supporting pivot members of the stop blades, and a cam member having cams engaging with the drive pins, the plurality of stop blades forming an aperture,
wherein the cam member includes a plurality of cams of which the largest radial distances from the center of the aperture are different from each other, the radially inner end of at least one of cams arranged at radially outer positions is located closer to the center of the aperture than the radially outer end of at least one of cams arranged at radially inner positions, and
the plurality of stop blades include first stop blades and second stop blades, the radial distance of the drive pins of the first stop blades from the center of the aperture and the radial distance of the drive pins of the second stop blades from the center of the aperture are different from each other in an open aperture state; and
a camera apparatus coupled with the lens apparatus.

* * * * *